United States Patent [19]
Takada, deceased et al.

[11] 3,926,227
[45] Dec. 16, 1975

[54] LOAD SENSITIVE BELT

[75] Inventors: Takezo Takada, deceased, late of Tokyo, Japan; by Juichiro Takada, legalized authorized heir, Tokyo, Japan

[73] Assignee: Takata Kojyo Co., Ltd., Tokyo, Japan

[22] Filed: Dec. 21, 1973

[21] Appl. No.: 427,282

[30] Foreign Application Priority Data
Dec. 28, 1972 Japan............... 47-148602[U]

[52] U.S. Cl............ 139/383 R; 139/416; 139/426 R
[51] Int. Cl.²................................................ D03D 15/00
[58] Field of Search........ 139/383 R, 384 R, 426 R, 139/420 R, 416, 417; 280/150 SB

[56] References Cited
UNITED STATES PATENTS

| | | | |
|---|---|---|---|
| 835,083 | 11/1906 | Strahl............................ | 139/417 |
| 2,190,053 | 2/1940 | Amyot........................... | 139/384 R |
| 2,272,229 | 2/1942 | Tucker........................... | 139/383 R |
| 2,471,166 | 5/1949 | Neff............................... | 139/383 R |
| 2,797,712 | 7/1957 | Shapiro.......................... | 139/383 R |
| 3,463,202 | 8/1969 | Wildi et al. .................... | 139/383 R |
| 3,612,110 | 10/1971 | Wildi et al. .................... | 139/383 R |
| 3,756,288 | 9/1973 | Seo et al. ....................... | 139/383 R |
| 3,823,748 | 7/1974 | Allman et al. ................. | 139/383 R |

Primary Examiner—James KeeChi
Attorney, Agent, or Firm—Wolder & Gross

[57] ABSTRACT

A load sensitive belt in which some of the ground threads are replaced by shorter threads of varying load capacity. In all cases the load capacities and inherent extensibility are less than that of the ground threads.

The shorter threads may be color coded so that the amount of stress placed upon a belt may be observed by noting which of the threads shear.

3 Claims, 8 Drawing Figures

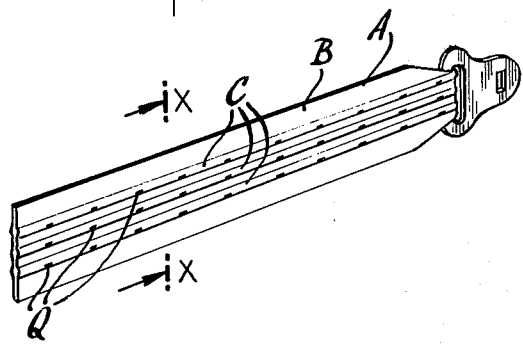
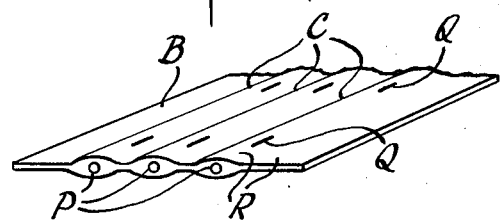
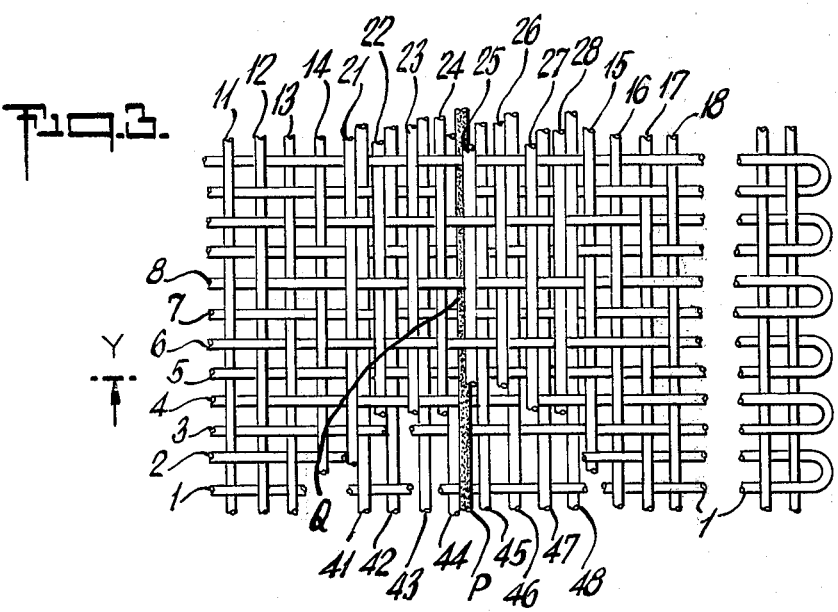
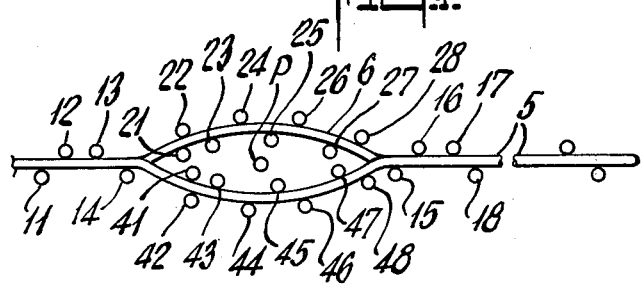

U.S. Patent   Dec. 16, 1975   Sheet 2 of 2   3,926,227
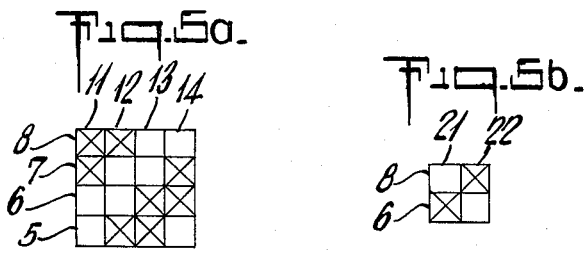
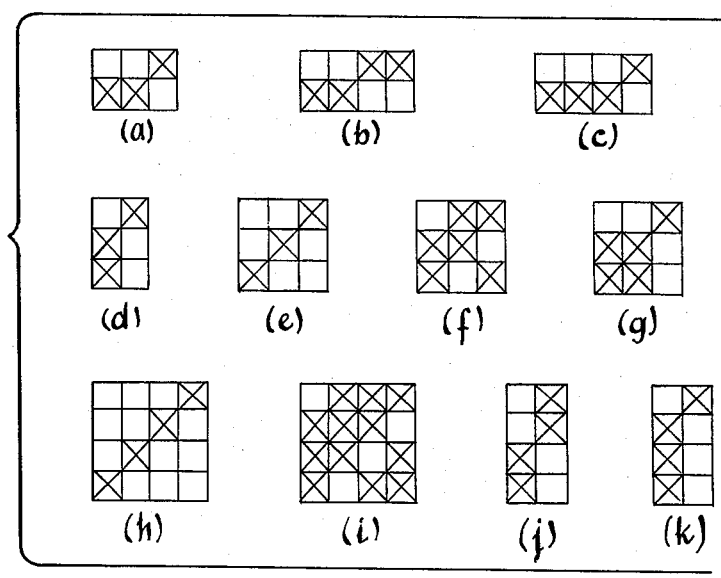
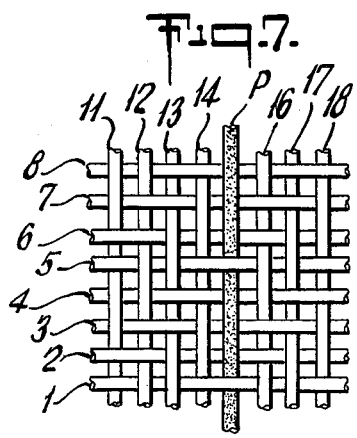

LOAD SENSITIVE BELT

BACKGROUND OF THE INVENTION

The invention relates to load sensitive belts, and more particularly to belts having indicated threads of varying load capacity.

The safety belts adapted in motor vehicles or such are designed to securely hold the belt wearer in the event of an abnormal event, such as a collision, absorbing the kinetic energy created by the belt wearer. Generally, however, such safety belts have a high load stress factor so that if a large load is once applied to the belt, due to collision or for other reasons, although the belt suffers no apparent external damage or loss, the energy absorbability of the belt is reduced substantially. Thus, it is dangerous if the belt is kept installed in the vehicle. It is known to insert threads in certain parts of the web to observe the result of energy absorption of the safety belt.

OBJECTS OF THE PRESENT INVENTION

Accordingly, it is among the principal objects of the present invention to provide a load sensitive belt with means to indicate the amount of stress placed thereon.

Still another object of the present invention is to provide a load sensitive belt in which some of the ground threads are replaced by color coated threads of lesser load capacity.

Still yet another object of the present invention is a color code to replace threads in accordance with their varying amount of load capacity.

Still yet a further object of the present invention is to provide replace or support threads which are of lesser inherent extensibility.

BRIEF DESCRIPTION OF THE INVENTION

According to the present device, different-quality threads (hereinafter referred to as "separate threads") are inserted when weaving a web for a safety belt, and then the web is dyed. The separate thread is of the type which is either undyed or, if dyed, presents a color different and easily distinguishable from the color of the ground thread portion, and such separate threads are inserted at predetermined intervals along the web so that they are readily visible on the web surface. Also, the separate threads have less inherent extensibility and are shorter in woven length than the ground thread, so they will be sheared when subject to a certain level of load. The amount of load is lower than the load level at which the ground thread is sheared, thus allowing judgment of the performance or capability of the load-exerted safety belt according to which of the separate threads shear.

Now, the present device is described in detail with reference to the accompanying drawings.

FIG. 1 is a partial perspective view of a safety belt according to the present device;

FIG. 2 is a perspective view including the X—X section of FIG. 1;

FIG. 3 is an enlarged plane view of the portion indicated by R in FIG. 2, with parts brokwn away;

FIG. 4 is a sectional view taken along the line Y—Y of FIG. 3;

FIG. 5a shows a grammatized texture of the ground thread portion B;

FIG. 5b shows a grammatized texture on the front side of the hollowed portion C;

FIG. 6 shows grammatized textures on the front side of the ground thread portion or hollowed portion according to another embodiment of the present device; and FIG. 7 shows still another embodiment of the present device where no hollowed portion is provided.

FIG. 1 is a perspective view of a part of a safety belt embodying the present invention, and FIG. 2 is a sectional view taken along the line X—X of FIG. 1. The web A consists of the ground thread portion B and one or more ridges of hollowed portions C. The separate thread P is woven in such a manner that it is passed through each of said hollowed portions C and exposed on both front and back sides of the web as at the locations Q at predetermined intervals. FIG. 3 is an enlarged view of the portion indicated by R in FIG. 2, showing the texture of the web A and the interior of the hollowed portion C, with parts broken away. FIG. 4 is a sectional view taken along the line Y—Y of FIG. 3. FIG. 5A shows the tecture of the ground thread portion B, and FIG. 5b shows the surface texture of the hollowed portion C.

The ground thread portion B is composed of the ground warp threads 11–18 formed from Tetoron (registered trademark) filaments of a suitable denier, while each ridge of the hollowed portions C is composed of the front-side warp threads 21–28 and back-side warp threads 41–48 formed from the same material as the ground thread portion B, and one or more pieces of separate thread P made of vinylon or the like are passed centrally through each hollowed portion C. The separate threads are made of a material having lower inherent extensibility than and different dyeing affinity from the ground thread portion B. For this purpose, vinylon yarn, glass fiber, hemp yarn or such is used and given a suitable twist so that a peculiar inherent extensibility will be provided to each kind of the separate threads. The wefts 1–8 are made of the same material as the ground thread portion B. Both warp and weft threads 11-18 and 1-8 are arranged in parallel rows, but in the hollowed portion C the weft threads 2, 4, 6, 8 . . . intersect the frontside warp threads 21-28 while the weft threads 1, 3, 5, 7 . . . intersect the backside warp threads 41–48, so as to produce a texture such as shown in FIG. 5.

Each separate thread P is inserted through each hollowed portion C such that it will be visible from the front or back side at suitable intervals as for instance at the location Q where the ridge frontside warp thread 25 and weft thread 8 intersect each other.

FIG. 6 shows disgrammatically the textures on one side of the ground thread portion B or the hollowed portion C according to another embodiment of the present device, and FIG. 7 shows the texture according to still another embodiment where no hollowed portion C is formed and the web is composed of the warp threads 11–18 and weft threads 1–8, and one or more of the warp threads are replaced by the separate thread P. As apparent from the drawing, the separate thread P is provided with less texture points than the gound thread and accordingly possesses a lesser weave crimp than the ground thread. The drawings of FIGS. 5 and 6 show that all of the similar textures are embranced within the scope of the present device.

In operation of the present device, when a certain load in an amount of about 1/5 to ⅛ of the final shearing or cutting load of the web A is imparted to the web of the safety belt in the event of a sudden stop or other abnormal situation of the vehicle, it is possible to learn about what extent of load has been applied according to the type or condition of the cuts of the separate thread P. It is also possible to judge, according to the thus learned amount of load, whether reuse of the belt is possible or not, or in case other parts of the safety belt such as retractor or buckle are damaged in such abnormal situation of the vehicle, whether such damage on said parts is within the tolerance of the design load, or to know the capability of the belt after such load has been exerted. Thus, the webbing according to the present device is fundamentally different from the energy absobring type belts in their objects of use and functions.

According to the present device, the safety belts having the above-described magnificent effects can be obtained by merely following the same weaving process as used in the prior art.

I claim:

1. A load sensitive belt comprising an elongated web including longitudinally extending ground warps and indicator warps and characterized in that said indicator warps are at least partially visible along a face of said web and possess a lesser rupture elongation than said ground warps and are of different color than and visually distinguishable from said ground warps at said face of said web whereby said indicator warps rupture upon a load exceeding a predetermined value being applied to said belt less than the value of the rupture load of said belt and the rupture of said indicator warps are observable at a face of said web.

2. The load sensitive belt of claim 1 having longitudinal passageways woven therein and said indicator warps extend along said passageways and extend to a face of said webs and are visible at said face at longitudinally spaced intervals.

3. The load sensitive belt of claim 1 wherein said indicator and ground warps have different dyeing affinities.

* * * * *